Patented Feb. 28, 1939

2,148,895

UNITED STATES PATENT OFFICE 2,148,895

SHAPED ARTICLES FROM CELLULOSE

Wilhelm Becker, Cologne-Mulheim, Otto Bayer, Leverkusen, and Walter Harz, Dormagen, Germany, assignors to I. G. Farbenindustrie Aktiengesellschaft, Frankfort-on-the-Main, Germany No Drawing. Application September 15, 1936, Serial No. 100,898. In Germany October 4, 1935

5 Claims. (Cl. 18—54)

The present invention relates to the manufacture of shaped articles from cuprammonium cellulose solutions.

On precipitating cellulose from its ammoniacal copper oxide cellulose solutions with aqueous precipitating liquids often the formation of solid cupric hydroxide which settles in the precipitating funnel is to be observed which renders a continuous working extremely difficult. It is known that the formation of the cupric hydroxide may be prevented by certain additions to the cellulose solutions or to the precipitating liquids; hydroxycarboxylic acids such as tartaric acid, citric acid or salts of the same have been suggested for instance.

It has now been found that for the purpose in question especially such aliphatic hydroxycarboxylic acids are suitable as have at least 2 hydroxy groups for each carboxylic group, or watersoluble salts thereof. Aliphatic hydroxy carboxylic acids of the character described show an excellent capability of forming complex compounds. They can be produced in a simple and economical manner, f. i. by oxidizing carbohydrates. As aliphatic hydroxy carboxylic acids there may be mentioned f. i. saccharic acid, the reactivity of which for the purpose in question being about twice as high as that of tartaric acid; that means, when working in the presence of saccharic acid only the half of the otherwise employed quantity of tartaric acid (calculated on the molecular amount) is sufficient for practically completely preventing the formation of the cupric hydroxide. Another acid which has proved to be suitable is arabonic acid; it can be obtained according to known methods, f. i. also by oxidizing carbohydrates in an alkaline solution.

The hydroxycarboxylic acids of the character described may be added as such or in form of soluble salts, if necessary, in a pure state. An especial advantage of their application lies in the fact that the solutions obtainable by the oxidation of carbohydrates can also be immediately used, the isolating of the pure acids being dispensed with. In case, the raw solutions obtainable by oxidation even show a reduction capacity towards Fehling solution it is of advantage to remove the same, which may f. i. be effected by reduction with zinc dust in an alkaline medium or by an alkaline treatment, probably a Cannizzaro reaction occurring thereby. Solutions which are obtainable as described above, containing besides saccharic acid also oxalic acid, gluconic acid etc. show an excellent capability of forming complex compounds with copper oxide hydrate and can be employed without injuring the strength of the artificial silk.

The substances or solutions mentioned above may be added to the ammoniacal copper oxide cellulose solutions either directly or to the aqueous precipitating liquids. Generally quantities of 1–10% calculated on the weight of the cellulose are sufficient for preventing the precipitation of cupric hydroxide; but also larger or smaller quantities may be added.

The following examples illustrate the invention without, however, restricting it thereto, the parts being by weight:

Example 1

To an ammoniacal copper oxide cellulose solution with a cellulose content of 7.5%, an ammonia content of 8% and a copper content of 3.6%, 3 parts of saccharic acid in the form of an alkaline solution are added to 100 parts each of cellulose. For evenly distributing the saccharic acid the solution is stirred, and, after the usual evacuating process is spun to artificial silk according to the stretching-spinning process. The sedimentation of solid copper compounds at the glass walls of the spinning funnel in this case is much lower than when spinning without the addition of saccharic acid. The values for tenacity and extension of the artificial silk are the following ones:

Tenacity:   Dry, 180–185   Wet, 105–110
Extension:  Dry, 15.0–16.5 Wet, 23.0–25.0

Example 2

110 parts of starch are oxidized with 430 parts of nitric acid at 90° C. while stirring as described by Kiliani in "Berichte der deutschen Chemischen Gesellschaft, vol. 58, page 2345". The solution thus obtained which has been evaporated until it has a brown shade is then neutralized while cooling by means of a 40% caustic soda solution. On the further addition of 50% of the caustic soda solution calculated on the amount necessary for effecting the neutralization the mixture is allowed to stand for 4–5 days at room temperature, whereafter no reduction towards Fehling solution is to be observed. The solution thus obtained which can be rendered lighter by means of hydrogen peroxide or hydrosulfide or by filtration over fuller's earth f. i., is added in an amount of 15 parts each upon 100 parts cellulose to an ammoniacal copper oxide cellulose solution and spun as described in Example 1.

We claim:

1. In the process for the manufacture of shaped cellulose articles from ammoniacal copper oxide cellulose solutions the step which comprises precipitating the cellulose in the presence of a compound of the group consisting of aliphatic hydroxy carboxylic acids being prepared by oxidation from carbohydrates and containing at least two hydroxy groups for each carboxylic acid group, and water soluble salts thereof.

2. A process as claimed in claim 1 in which there is used an ammoniacal copper oxide cellulose solution to which has been added a solution prepared by oxydation of carbohydrates and containing aliphatic hydroxycarboxylic acids with at least two hydroxy groups for each carboxylic acid group.

3. A process as claimed in claim 1 in which there is used an aqueous precipitating bath to which has been added a solution prepared by oxydation of carbohydrates and containing aliphatic hydroxycarboxylic acids with at least two hydroxy groups for each carboxylic acid group.

4. A process as claimed in claim 1 in which there is used an ammoniacal copper oxide cellulose solution to which has been added a solution prepared by oxydation of carbohydrates and containing aliphatic hydroxycarboxylic acids with at least two hydroxy groups for each carboxylic acid group, and from which the capability of reduction towards Fehling's solution has been removed.

5. A process as claimed in claim 1 in which there is used an aqueous precipitating bath to which has been added a solution prepared by oxydation of carbohydrates and containing aliphatic hydroxycarboxylic acids with at least two hydroxy groups for each carboxylic acid group, and from which the capability of reduction towards Fehling's solution has been removed.

WILHELM BECKER.
OTTO BAYER.
WALTER HARZ.